Aug. 6, 1957 W. P. ADAMS 2,801,759
HAY CARRYING AND FEEDING MACHINE
Original Filed Aug. 17, 1951 2 Sheets-Sheet 1

INVENTOR.
Wayne P. Adams
BY

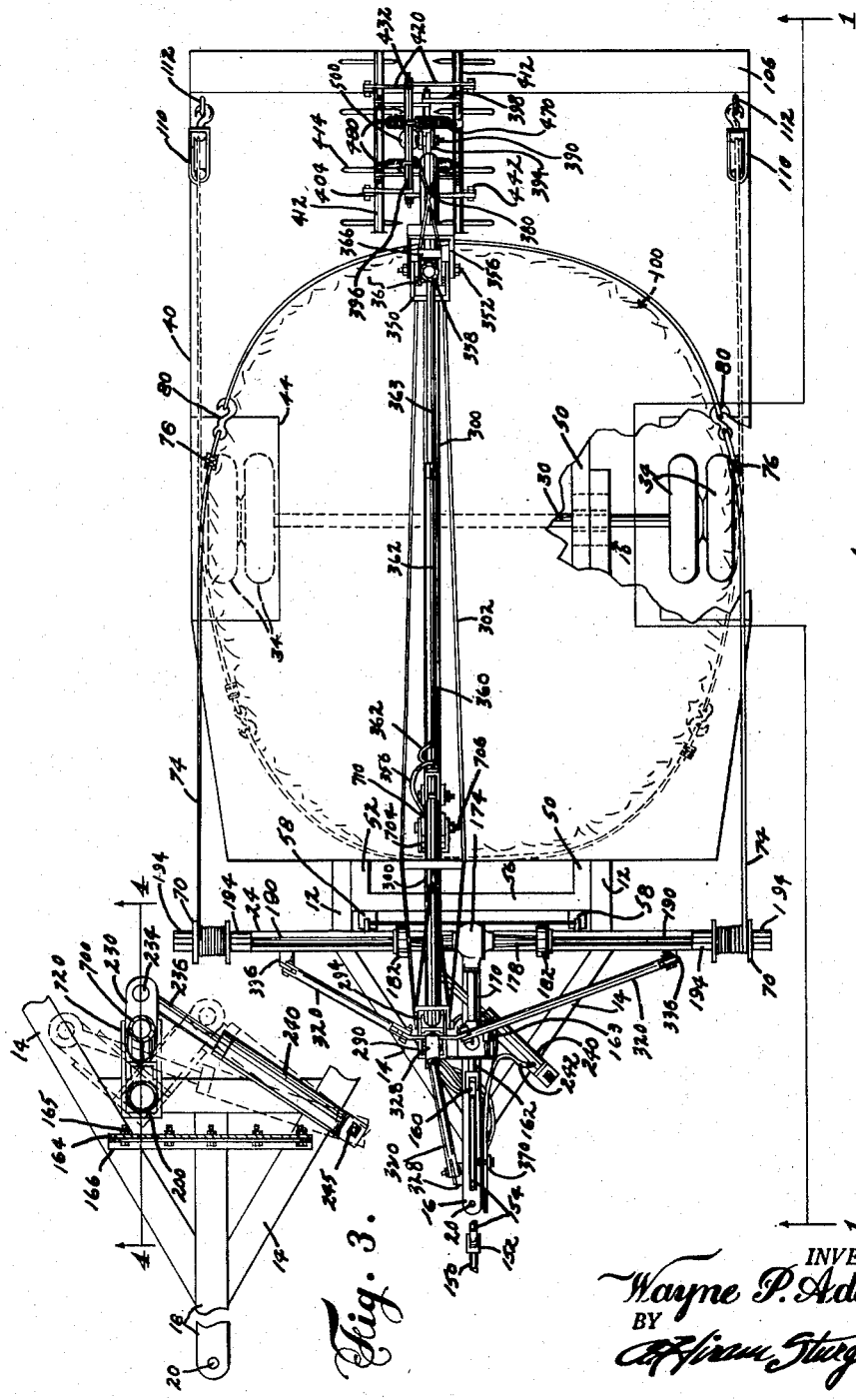

United States Patent Office 2,801,759
Patented Aug. 6, 1957

2,801,759

HAY CARRYING AND FEEDING MACHINE

Wayne P. Adams, Alliance, Nebr.

Continuation of application Serial No. 242,277, August 17, 1951. This application December 23, 1954, Serial No. 477,202

2 Claims. (Cl. 214—506)

This invention relates to the feeding of livestock and more particularly it is an object of this invention to provide means for mechanically delivering hay to livestock.

Objects of this invention are to provide mechanisms for accomplishing the following operations: the pulling of a haystack onto a carrier; the grasping of portions of the haystack and distribution of such portions onto a field while the carrier is either moving or standing still; and for pushing a remainder of the haystack back of the carrier.

Another object of the invention is to provide a hay carrier which can be used for the transportation of haystacks at times other than during feeding of stock.

A particular object of the invention is to provide a hay carrier having a tilting platform which is adapted to engage the ground at its rearward end for receiving hay thereon, the platform being balanced so that its rearward end is downward while receiving a haystack and so that the weight of the haystack causes the platform to tilt into horizontal position as the stack is pulled on.

Another object of the invention is to provide hydraulically controlled means for grasping and distributing portions of a haystack.

A principal object is to provide, combined in one machine, a complete outfit for rapid and efficient mass feeding of hay to stock.

This is a continuation of the applicant's co-pending patent application entitled "Hay Feeding Machine," Serial No. 242,277, filed August 17, 1951, and now abandoned.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1 is a side elevation of the hay feeding machine of this invention, a haystack being shown thereon in dotted lines. Other dotted lines indicate a lower position of the platform of the machine and still further dotted lines indicate the position of the cable system of the invention disposed in a position for pushing the stack back off of the platform. Figure 1 is a view as seen along the line 1—1 of Figure 2.

Figure 2 is a top plan view of the hay carrying assembly shown with a haystack thereon, the haystack being indicated by dotted lines. A portion of the platform is broken away for showing the means of pivotally mounting the platform on the rear axle of the hay carrier.

Figure 3 is a view-in-section taken looking downwardly along the line 3—3 of Figure 1.

Figure 4 is a view-in-section taken looking along the line 4—4 of Figure 3.

Referring now to the drawings for more complete description, the hay carrying machine of this invention has a frame generally indicated at 10 in Figure 1.

The frame 10 has two longitudinally extending members 12 having at their forward ends two frame members 14 which are disposed inclining inwardly towards each other at the forward end of the machine.

The forward ends of the frame members 14 meet a longitudinally extending frame member 16 which is provided at its forward end with an aperture 20 for receiving a drop bolt. It will be understood that any means can be used for securing the hay sled to a towing vehicle, the drop bolt aperture 20 being shown only as an illustration of one way.

Between the members 12 and 14 a transversely extending frame member 24 is provided. At the rearward ends of the members 12 the latter are provided with apertures for receiving the rear axle 30 of the machine. The rear axle 30 extends transversely and is provided on its ends with wheels 34.

A haystack carrying platform 40 is provided, the platform 40 being made in any suitable manner. Preferably, the platform 40 has a transverse width greater than the transverse wheel base and for this reason wheel housings 44 are provided which have concave recesses in their lower sides. The housings 44 are mounted upon the platform 40 and are adapted to receive the upper sides of the wheels 34.

The platform 40 is supported upon two longitudinally extending frame members 50 and 52 which latter are provided with apertures for receiving the rear axles 30. As thus described, it will be seen that the platform 40 is pivotally supported for tilting motion about a transverse axis at the rear axle 30.

The forward ends of the members 50 and 52 are joined to a transversely extending frame member 56. The frame member 56 is provided with ears 58 protruding outwardly from the forward end thereof.

The ears 58 are adapted to be engaged by latch hooks 62 which are vertically disposed and are pivotally mounted upon tabs 64 which latter protrude outwardly and rearwardly from the transverse frame member 24. The tabs 64 are disposed adjacent the centers of the hooks 62. At their lower ends the hooks 62 are attached to springs 67, which latter are in turn attached to anchor members 68. The anchor members 68 are secured to the lower side of the frame members 24.

As thus described, the platform 40 is free to pivot about the axle 30 and to assume the dotted line position shown in Figure 1. When the platform is caused to tilt downwardly at its forward end, however, the hooks 62 will engage the ears 58 for maintaining the platform 40 in horizontal position.

At their upper ends the hooks 62 are provided with apertures 69 to which means, not shown, can be attached for releasing the hooks 62.

The machine is provided with two winches 70 disposed at opposite ends of the frame member 24. The winches 70 are for receiving cables 74 which latter extend rearwardly and are attached by cable clamps 76 to hooks 80 which latter are hooked into elliptical rings 90, as best seen in Figure 1.

The elliptical rings 90 are each provided with attached eyelets 92 on the upper and lower sides thereof. Upper and lower belts 96 made of cable or other suitable, preferably flexible, material are attached to the eyelets 92 and extend from one of the rings 90 to the other.

The platform 10 is for the purpose of receiving a haystack diagrammatically shown by the line 100. In order to get the haystack 100 up and onto the platform 10 the machine is first brought to the haystack. The platform is then allowed to tilt into the dotted line position shown in Figure 1. This is easily done by releasing the hooks 62 because the rearward end of the platform 10 is heavier than the forward end whereby it overbalances downwardly at its rearward end.

The winches 70 are then operated for permitting the cables 74 to be pulled rearwardly so that the belts 96 can be placed about the rearward side of the haystack 100. The winches 70 are then caused to operate by means to be later described for pulling the stack 100 up onto the platform 10 and into a position such that the platform will overbalance forwardly and move into the horizontal position, being caught by the hooks 62. It will be noticed that the rearward end of the platform has a downwardly inclined ramp portion 106.

In order to get the haystack back off of the platform 10 the cables 74 are arranged so that they extend rearwardly about pulleys 110 which latter are anchored by eye bolts 112 to the rearward and outer corner of the platform 10.

As thus described the cables 74 go through the pulleys 110 and extend forwardly again and are attached as previously described to the belt 96 by means to the elliptical ring 90. The belt assembly 96 is placed about the forward end of the haystack 100 and the winches 70 are operated for winding up the cable 74 to pull the haystack 100 back off of the platform when desired.

The winches 70 are caused to operate by means now to be described. The rearward end of the power-take-off of a tractor is shown at 150 attached by means of a universal joint 152 to an upwardly and rearwardly inclining shaft 154 attached at its rearward end by a universal joint 160 to a rearwardly extending shaft 162.

The shaft 162 extends into a transmission 163 having a gearshift lever 168 extending upwardly therefrom. The transmission is secured at it forward plate 164 by bolts 165 to an angleiron 166 secured to the frame members 14.

A shaft 170 extends rearwardly from the transmission 163 to a differential housing 174. The shafts 178 extend transversely out of each side of the differential 174 and to a brake drum 182. Extension shafts 190 extend transversely from each brake drum 182 and through bearings 194 to the winches 70.

The machine is provided with means for grasping the hay from the stack 100 and distributing it to the sides of the machine part by part. Such means includes a mast generally indicated at 200. The mast 200 is rotatably mounted at its lower end. For this purpose a mast set 206 is provided mounted upon a transverse frame member 208 extending between the frame member 14. The frame member 208 is also for the purpose of supporting the differential 163.

The mast set 206 is provided with a recess 210 in its upper end for receiving a tapered roller bearing fitting 212 which is rotatably upheld by tapered roller bearing 216. The fitting 212 has a flange 218 for engaging the underside of the hollow mast 200 and the fitting 212 fits up into the mast 200 being held in place by a bolt 220.

An arm 230 extends rearwardly from the mast 200 and is secured to the mast 200. The arm 230 is secured by means of a bolt 234 to the piston rod 236 of a hydraulic ram 240. The ram 240 is pivotally mounted at the opposite end by means of a bolt.

The ram 240 has a hydraulic hose 242 extending therefrom forwardly to be attached by means not shown, to the source of hydraulic power in a vehicle pulling the hay carrying machine. The purpose of the ram 240 is to control the rotation of the mast 200 about a vertical axis.

At the top of the mast 200 a fitting 290 is provided having flat sides for receiving the opposite ends of the U-shaped yoke member 294. The yoke 294 is attached to the member 290 of a pin 296. The yoke 294 is attached to a rearwardly extending boom 300 which latter is braced by rods 302 held in position by a martingale 306. The ends of the rods 302 are attached to the opposite ends of the boom 300.

The mast 200 is itself held up by three stay braces 320.

The braces 320 are disposed in tripod arrangement extending downwardly at the sides and front of the mast 200. The braces 320 are attached to straps 328 which are in turn attached to a vertically disposed insert member 330. The member 330 extends downwardly into the open upper end of the mast 200 for maintaining the mast in desired position. The lower ends of the stay braces 320 are attached by straps 336 to the transverse frame member 24 and to the longitudinally extending member 16. At the rearward end of the boom 300 a second U-shaped yoke 350 is provided. The yoke 350 is attached by a pin 352 to a yoke 356, which latter is attached to a normally downwardly extending spar 358. The pivotal attachment at the pin 352 permits the spar 358 to swing in a vertical plane about the horizontally disposed pin 352.

The position of the spar 358 is controlled by a ram 360 having a hydraulic hose line 362 to which oil can travel to urge the piston rod 363 of the ram 360 in the directon of the arrow 364. The hoseline 362 winds downwardly along the boom 300 and mast 200 to terminate at the front and forward end of the frame of the vehicle held in place by a strap 370. The other hydraulic hose line 356 of the ram 360 extends outwardly from the other end of the ram 360 and also winds downwardly along the mast 200, also terminating under the strap 370.

The spar 358 is braced by brace rods 380 which latter are attached at their ends to the different ends of the spar 358. The rods 380 are held in place by martingales 386 and 388 respectively.

The piston rod 363 is attached by means of a horizontal pivot bolt 365 and a yoke 366 to the upper end of the spar 358. A rod 367 is used to brace the yoke 366. The spar 358 is attached by means of a horizontally disposed bolt 390 to a yoke 394 which latter itself is attached to a horizontally disposed shaft 396.

The shaft 396 is pivotally attached to bars 398 which extend downwardly from each end of the shaft 396. The bars 398 are disposed two pairs, one pair on each end, one of each two bars 398 of a pair extending downwardly and outwardly in a different direction from the other and being pivotally attached by ears 404 and suitable pins 406 to the upper sides of two horizontally disposed spaced apart parallel tine bars 412.

The tine bars 412 are disposed in parallelism with the shaft 396 and are provided with oppositely disposed tines 414 extending downwardly from each respectively.

Elongated linkage bars 420 are provided in two pairs, each pair being spaced from each end of the shaft 396. The pairs of linkage bars 420 are pivotally attached at their upper ends to a shaft 430 by means of bolts 432.

The link bars 420 diverge downwardly to the outer ends of levers 404. The levers 404 are four in number, each being attached by means of a horizontal bolt 442 to the lower end of one of the link bars 420. The levers 404 are secured to the tine bars 412 and extend outwardly therefrom.

A pair of coiled tension springs 470 are provided, one spring being disposed on each side of the shaft 396. The springs 470 are secured at their upper ends to the shaft 430 and are pivotally secured by any suitable means to levers 480. The levers 480 are four in number and are attached to the tops of the tine bars 412, extending inwardly therefrom in generally horizontal positions.

A hydraulic ram 500 has the top of its cylinder attached to the shaft 396 with the lower end of its cylinder extending downwardly therefrom. The piston rod, not shown, of the ram 500 extends upwardly to and is suitably secured to the shaft 430, by means not shown.

A hydraulic line 510 extends upwardly from the lower end of the ram 500 along the spar 358 and boom 300, being held in place by suitable clips 512. The line 510 extends downwardly along the forward side of the mast 200 and terminates under the bracket 370.

In operation the tines 412 of the claw generally indicated at 600 are normally held together by the coiled springs 470. When the operator desires, hydraulic fluid in the hose line 510 can cause the ram 500 to urge the shafts 396 and 430 apart, causing the link bars 420 to pull upwardly on the horizontal levers 404 for causing the tine bars 412 to rotate about the pivotal connecting pins 406 which attach the bars 412 to the members 398.

In operation it will be seen that controlling the hydraulic fluid entering the ram 240 will cause the mast 200 to pivot horizontally for swinging the boom 300 and consequently the claw 600 horizontally. Further movement of the claw 600 in a vertical direction is obtained by controlling the flow of hydraulic fluid to the ram 360.

The boom 300 is elevated by means of a ram 700 having a piston 702 and an end yoke 704. The end yoke 704 is secured by means of a horizontally disposed pin 706 to a yoke 710 which latter extends downwardly from and is secured to the lower side of the boom 300.

At its lower end the ram 700 is pivotally secured by the pin 716 to web 720 attached to the previously described arm 230. As thus described the ram 700 rotates in a horizontal plane simultaneously with the mast 200.

The control of the boom 300 in upward and downward motion is done by means of the ram 700. The ram 700 is urged downwardly by the weight of the boom 300 and associated mechanism. The ram 700 therefor has but one hoseline 730 which latter extends forwardly and terminates under the strap 370.

It will be understood that all hoselines extend to a source of hydraulic power, not shown, on a towing vehicle, also not shown.

From the foregoing description, it is thought to be obvious that a hay feeding machine constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A hay carrying machine comprising: a frame; wheels supporting said frame; a platform upheld by said frame for supporting a hay stack, said platform being pivotally secured to said frame for pivoting about a transverse axis to lower the rearward end of said platform to the ground for receiving said haystack, said transverse axis being disposed so that said platform tends to tilt downwardly at its rearward end when unloaded; releasable means for holding said platform in an approximately horizontal position during travel; a hay grasping mechanism comprising two sets of opposed tines movable toward and away from each other for grasping hay; a controllable crane secured to said mechanism vertically and laterally; means for controlling opening and closing of said hay grasping mechanism; and a winch and cable assembly for pulling a haystack from the ground up onto said platform.

2. A hay carrying machine comprising a frame; wheels supporting said frame; a platform upheld by said frame for supporting a haystack; a hay grasping mechanism comprising two sets of opposed tines movable toward and away from each other for grasping hay; a controllable crane secured to said mechanism and adapted to control movement of said mechanism vertically, longitudinally and laterally; means for controlling opening and closing of said hay grasping mechanism, said crane having a mast rotatable in a horizontal plane; hydraulic means for causing horizontal rotation of said mast; boom means secured to said mast and to said hay grasping mechanism; and hydraulic means for controlling vertical movements of said boom means.

References Cited in the file of this patent

UNITED STATES PATENTS

| | | |
|---|---|---|
| 2,121,153 | Konicek | June 21, 1938 |
| 2,228,447 | Evelev | Jan. 14, 1941 |
| 2,375,205 | Barras | May 8, 1945 |
| 2,411,183 | Baldwin | Nov. 19, 1946 |
| 2,496,876 | Kayser | Feb. 7, 1950 |
| 2,609,951 | Daniels | Sept. 9, 1952 |
| 2,674,380 | Boudreaux | Apr. 6, 1954 |
| 2,702,137 | Ives | Feb. 15, 1955 |